United States Patent
Barnes

(10) Patent No.: US 11,713,141 B2
(45) Date of Patent: Aug. 1, 2023

(54) SPACE DEBRIS ENGAGEMENT AND DEORBIT SYSTEM

(71) Applicant: L'GARDE, INC., Tustin, CA (US)

(72) Inventor: Nathaniel C. Barnes, Irvine, CA (US)

(73) Assignee: L'Garde, Inc., Tustin, CA (US)

(*) Notice: Subject to any disclaimer, the term of this patent is extended or adjusted under 35 U.S.C. 154(b) by 0 days.

(21) Appl. No.: 17/468,472

(22) Filed: Sep. 7, 2021

(65) Prior Publication Data

US 2022/0127020 A1   Apr. 28, 2022

Related U.S. Application Data

(63) Continuation of application No. 16/277,944, filed as application No. PCT/US2019/018346 on Feb. 15, 2019, now Pat. No. 11,142,349.

(60) Provisional application No. 62/631,297, filed on Feb. 15, 2018.

(51) Int. Cl.
| | | |
|---|---|---|
| *B64G 1/40* | (2006.01) | |
| *B64G 1/22* | (2006.01) | |
| *B64G 1/62* | (2006.01) | |
| *B64G 1/64* | (2006.01) | |
| *B65H 75/42* | (2006.01) | |

(52) U.S. Cl.
CPC ........... *B64G 1/407* (2013.01); *B64G 1/222* (2013.01); *B64G 1/62* (2013.01); *B64G 1/646* (2013.01); *B65H 75/425* (2013.01); *B64G 2001/224* (2013.01); *B65H 2701/371* (2013.01)

(58) Field of Classification Search
CPC .......... B64G 1/407; B64G 1/222; B64G 1/62; B64G 1/646; B64G 2201/224; B65H 75/425; B65H 2701/371
See application file for complete search history.

(56) References Cited

U.S. PATENT DOCUMENTS

| | | | | |
|---|---|---|---|---|
| 6,655,637 | B1* | 12/2003 | Robinson | B64G 1/646 244/172.4 |
| 8,770,522 | B1* | 7/2014 | Murphey | B64G 1/222 244/172.6 |
| 9,499,285 | B2* | 11/2016 | Garber | B64G 1/66 |
| 2002/0116877 | A1* | 8/2002 | Breitbach | B64G 1/222 52/2.18 |
| 2005/0103939 | A1* | 5/2005 | Bischof | B64G 1/646 244/172.4 |
| 2013/0175401 | A1* | 7/2013 | Starke | B64G 1/1078 244/171.1 |
| 2014/0042275 | A1 | 2/2014 | Abrams et al. | |
| 2014/0151485 | A1 | 6/2014 | Baudasse et al. | |

(Continued)

FOREIGN PATENT DOCUMENTS

| | | |
|---|---|---|
| CN | 106976571 A | 7/2017 |
| CN | 107150818 A | 9/2017 |

(Continued)

*Primary Examiner* — Rodney A Bonnette
(74) *Attorney, Agent, or Firm* — Fox Rothschild; Kari L. Barnes

(57) ABSTRACT

Exemplary embodiments described herein include innovative engagement devices. Exemplary engagement devices may include on or more tape spring systems. The tape spring system may include a continuous or segmented bi-stable tape spring. The tape spring can be stowed in a rolled up configuration, extended to a deployed configuration, and then triggered to return to a retracted configuration.

15 Claims, 11 Drawing Sheets

(56) References Cited

U.S. PATENT DOCUMENTS

2016/0130020 A1* 5/2016 Chambert ............ B64G 1/1078
244/172.4
2017/0058524 A1 3/2017 Fernandez

FOREIGN PATENT DOCUMENTS

| JP | 2014189145 A | 10/2014 |
|----|--------------|---------|
| WO | 2012092933 A1 | 7/2012 |

* cited by examiner

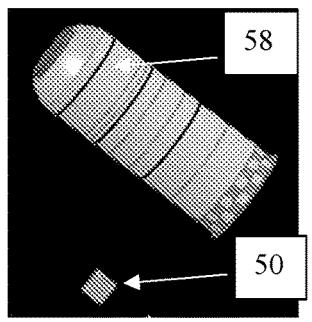 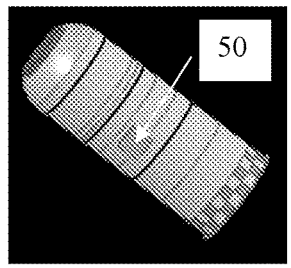 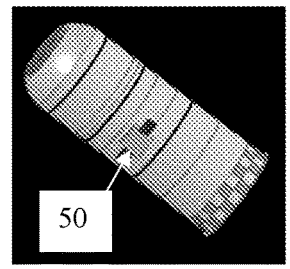 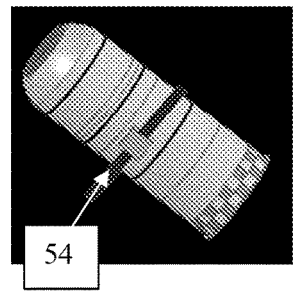
FIG. 5A  FIG. 5B  FIG. 5C  FIG. 5D
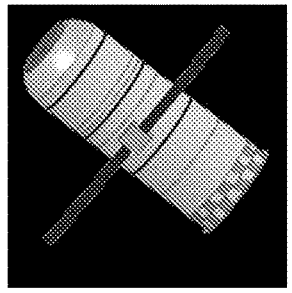 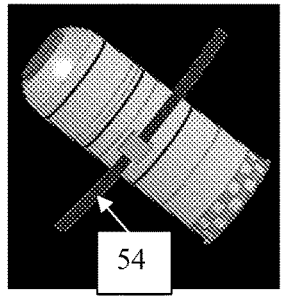 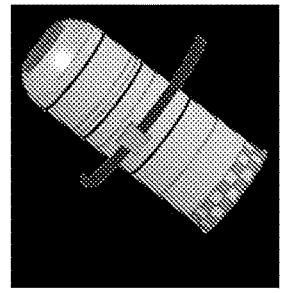 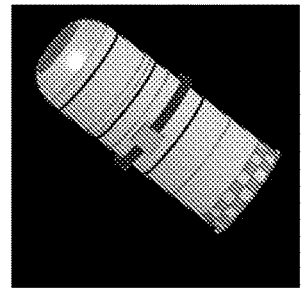
FIG. 5E  FIG. 5F  FIG. 5G  FIG. 5H

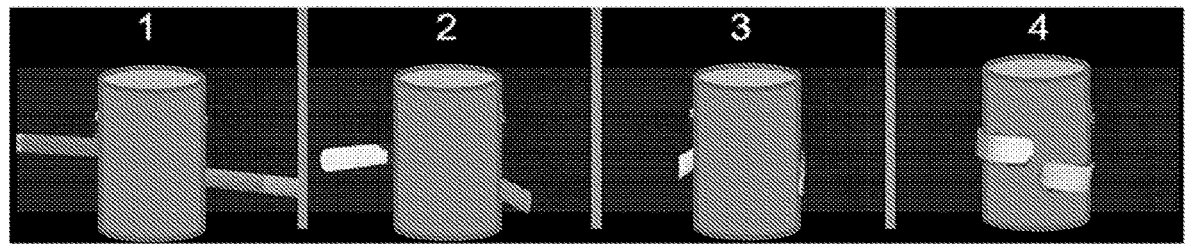
FIG. 7B
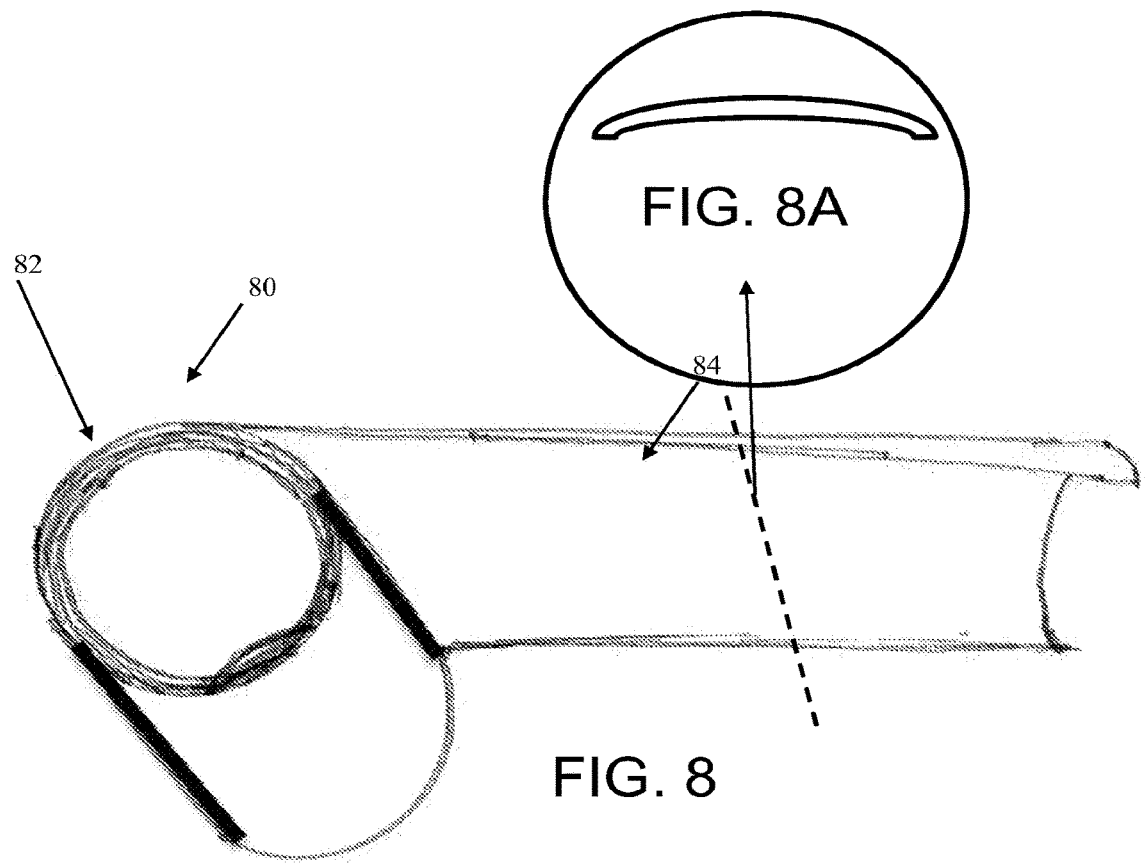
FIG. 8A
FIG. 8

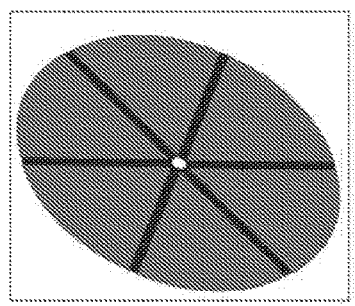 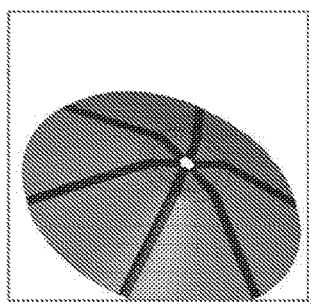 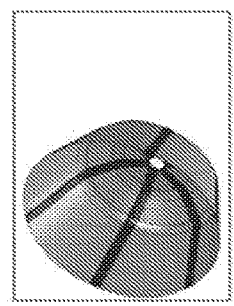 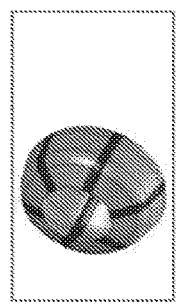
FIG. 13A    FIG. 13B    FIG. 13C    FIG. 13D
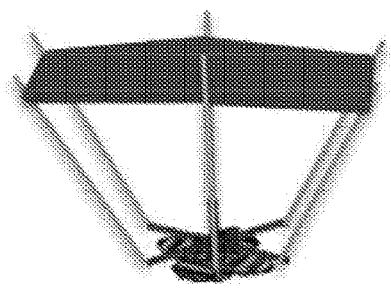
FIG. 14

SPACE DEBRIS ENGAGEMENT AND DEORBIT SYSTEM

PRIORITY

This application claims priority to U.S. Provisional Patent Application No. 62/631,297, filed Feb. 15, 2018, and is incorporated by reference in its entirety herein.

BACKGROUND

Rocket bodies from decades of launching satellites into Earth orbit are the largest component of space debris by mass. They may pose a significant present and future threat to operate space systems in certain orbits. Per the unclassified US catalog as of Jan. 1, 2017, there were 968 derelict rocket bodies in Low Earth Orbit (LEO) with perigees below 2100 km and inclinations ranging from near equatorial to retrograde as depicted in FIG. 1.

A significant amount of all the debris mass in LEO is embodied within 18 SL-16 rocket bodies. Each SL-16 rocket body has a mass of 8300 kg and measures 4 m by 10 m in diameter and length. The current cluster of SL-16 objects is dispersed across multiple altitudes from 750 to 850 km with widely varying inclinations from 70 to 100 degrees in inclination. A collision between any 2 of SL-16 s would double the number of objects in the LEO catalog. FIG. 2 is an exemplary representation of one of these rocket bodies positioned in LEO.

Traditionally, the active de-orbit problem has been solved through clever exploitation of orbital mechanics and physics to provide orbital authority. The focus has been on extracting free delta-V to ensure that system mass is minimized and that this "low priority" mission is not a burden on current space architectures. Design efforts have been focused on the capabilities of drag devices and propulsion systems, which leaves the engagement system often overlooked or left as a problem to solve later.

SUMMARY

Exemplary embodiments described herein include innovative engagement devices. Exemplary engagement devices may include on or more tape spring systems. The tape spring system may include a continuous or segmented bi-stable tape spring. The tape spring can be stowed in a rolled up configuration, extended to a deployed configuration, and then triggered to return to a low energy retracted configuration. The tape spring can also include a triggered return condition of other shapes, such as a linear, curvi-linear, or other configuration instead of the rolled configuration.

Exemplary embodiments of the engagement device may be coupled to conventional deorbit engines or deorbit engines as described herein. Exemplary engines described herein may include propellant-less engines. Exemplary engines described herein may be used to deorbit an engaged debris and/or may be used to navigate the engagement device to the debris object before engagement of the engagement device.

Exemplary embodiments of the engagement device may be used to capture the target SL-16 rocket bodies (or other object bodies of interest). Exemplary embodiments may therefore include navigating the engagement device to the object of interest, deploying the engagement device, using the engagement device to couple to the object of interest, and deploy the deorbit engine to deorbit the object of interest.

FIGURES

FIGS. 5A-5H illustrate exemplary configurations and intermediate configurations according to embodiments described herein.

FIGS. 7A-7B illustrate exemplary configurations of systems according to embodiments described herein.

FIG. 8 illustrates an exemplary tape spring according to embodiments described herein. FIG. 8A illustrates an exemplary cross section of the tape spring of FIG. 8.

FIGS. 13A-13D illustrate exemplary deployment configurations for systems according to embodiments described herein.

FIG. 14 illustrate an exemplary system according to embodiments described herein.

DETAILED DESCRIPTION

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Exemplary embodiments described herein may use tape springs to capture debris of interest. This innovative capture mechanism coupled with traditional de-orbit devices (prop modules, drag devices, tethers) to create a tape-spring engagement de-orbit system is a unique solution that addresses a growing need in space debris control. Exemplary embodiments include a novel engagement system that can couple well with traditional deorbit engines to provide a desired 10× deorbit time reduction as compared to conventional drag devices.

Although embodiments of the invention may be described and illustrated herein in terms of a debris deorbit mechanisms, it should be understood that embodiments of this invention are not so limited, but are additionally applicable to other applications. For example, component parts, such as the tape spring engagement system, may be used as an attachment method for other applications, including space applications. Also, embodiments described herein focus on the deorbit of rocket bodies, but this concept is applicable to many space-junk geometries or other objects. It is possible to tailor low energy states for the tape springs such that debris of various sizes can be engaged. It should also be noted that while the exemplary embodiment is described using only two tapes, it is possible that multiple tapes in various orientations are advantageous to engagement. Exemplary embodiments may include a single tape spring or any combination of a plurality of tape springs.

Figure 1:
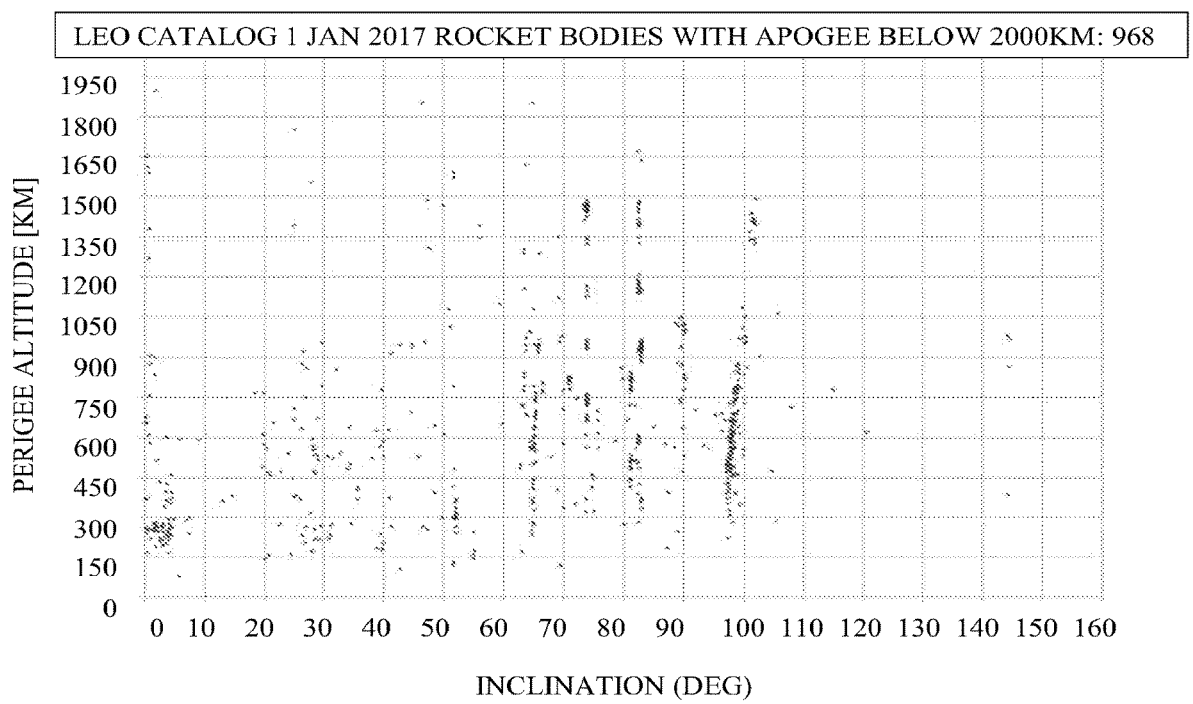
FIG. 1 illustrates a graphical representation of rocket bodies as space debris in low earth orbit.
Figure 2:
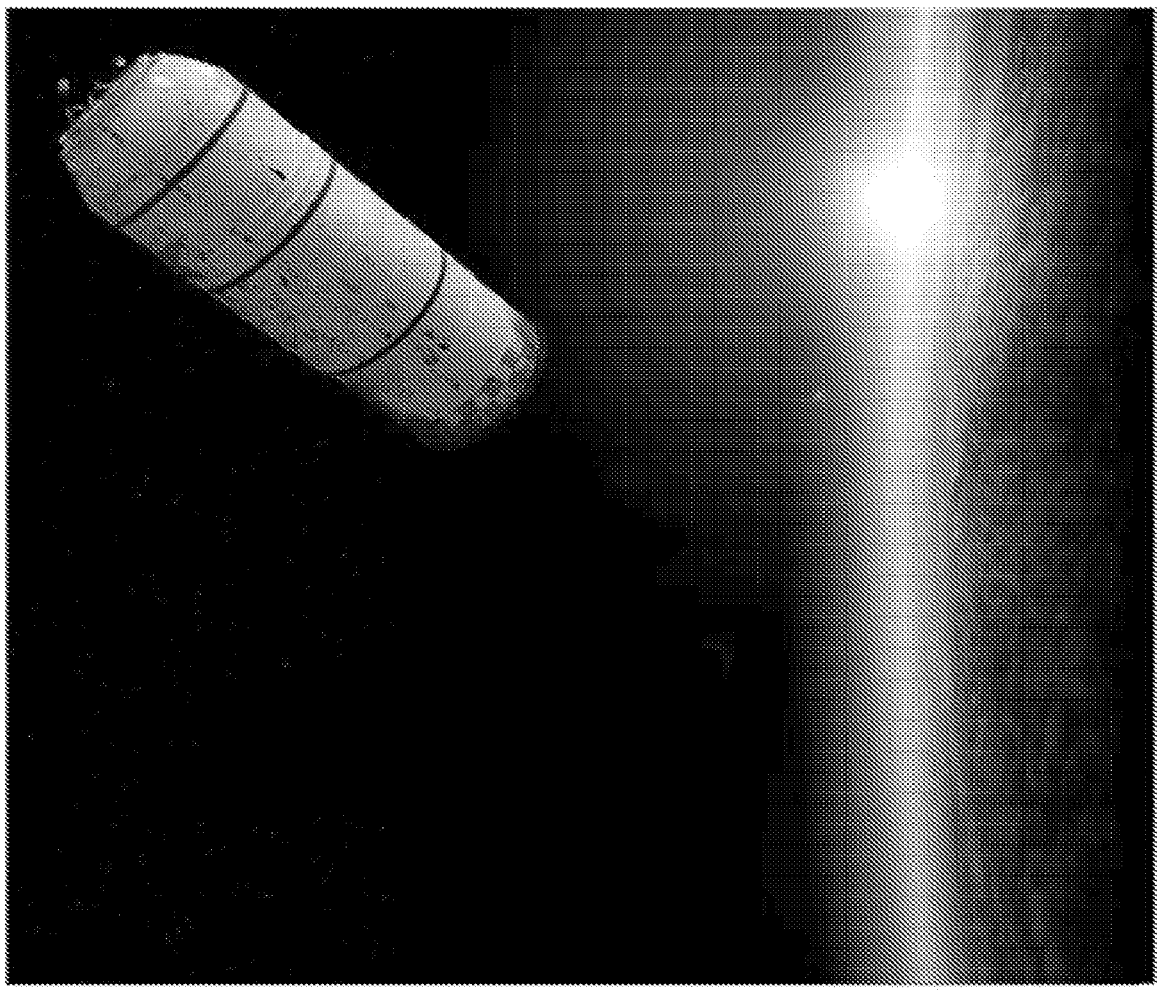
FIG. 2 illustrates an exemplary rocket body in lower earth orbit.
Figure 3:
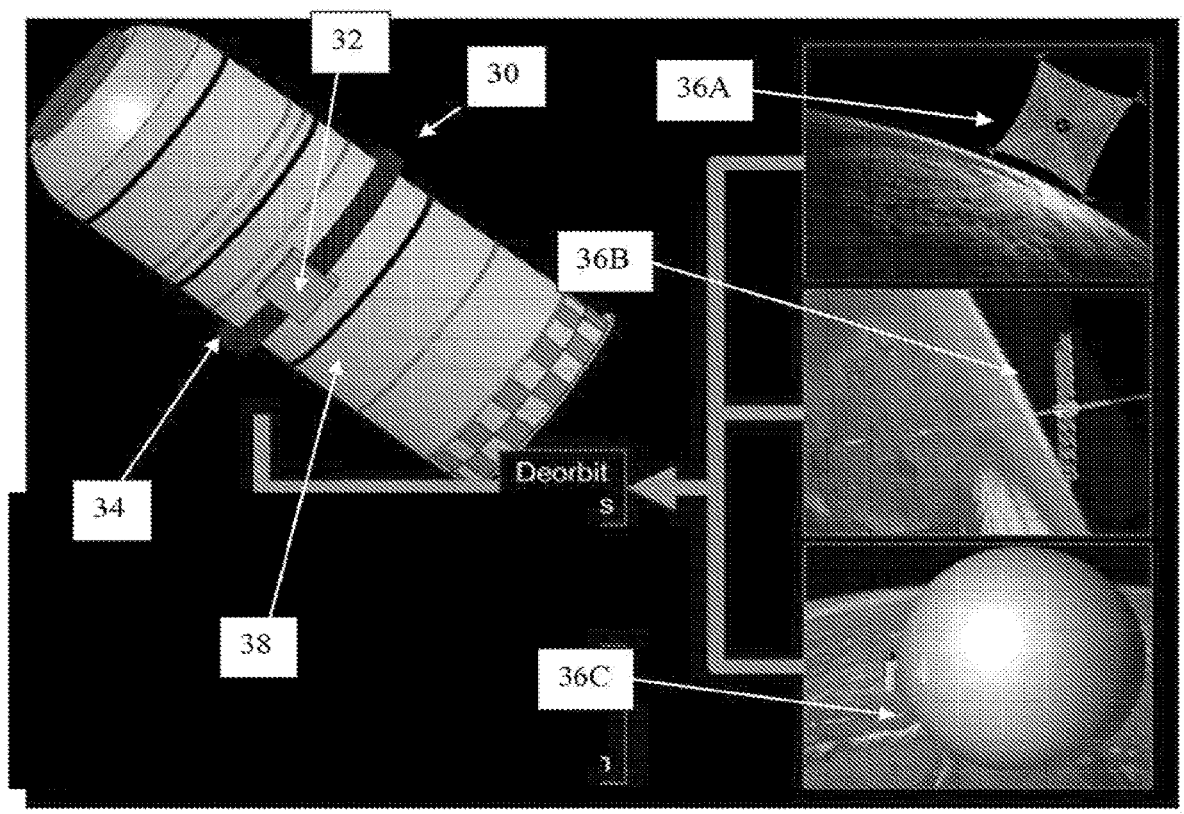
FIG. 3 illustrates an exemplary engagement device coupled to an object of interest and used in conjunction with exemplary alternative deorbit engines.

FIG. 3 illustrates an exemplary engagement device coupled to an object of interest and used in conjunction with exemplary alternative deorbit engines. An engagement device 30 may include a housing 32 and one or more tape springs 34. The tape springs may be coupled to the housing and extend therefrom. As shown in FIG. 3, the engagement device 30 may couple to an object of interest 38 by partially or fully circumscribing or encircling a circumference of the object. Once coupled, the object of interest may be deorbited by deploying a conventional deorbit engine 36A-36C. The deorbit engine may be coupled to housing 32 and deploy once the engagement device is attached to the object of interest. Exemplary deorbit engines may include a sail 36A, wing 36B, balloon 36C or other object to slow the speed of the object of interest.

Figure 4:
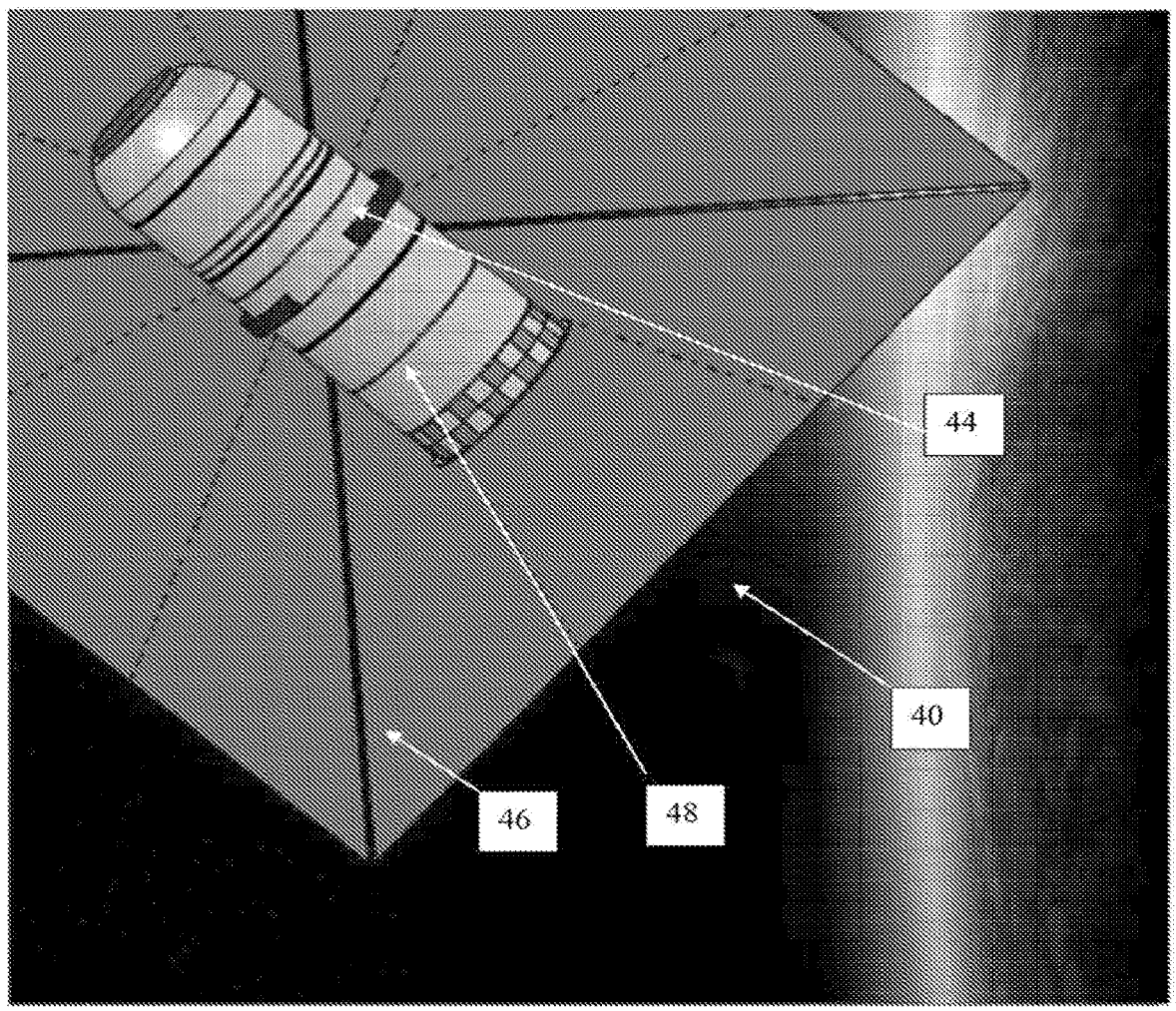
FIG. 4 illustrates an exemplary engagement device coupled to an object of interest with an exemplary deorbit engine deployed.

FIG. 4 illustrates an exemplary engagement device coupled to an object of interest with an exemplary deorbit engine deployed. FIG. 4 illustrates an exemplary engagement device 40 having two tape springs 44 coupled to an object of interest 48. The engagement device 40 is coupled to a vane sail deorbit engine 46. The vane sail deorbit engine may be configured to use both aerodynamic drag and solar radiation pressure to deorbit debris. This would allow the range of the debris that can be deorbited (or uporbited) to be extended well beyond 700 km.

FIGS. 5A-5H illustrate an exemplary progression of an embodiment of an engagement device maneuvering to an object of interest and deploying to couple to the object of interest. The engagement device may include a stored configuration, a deployed configuration, and a retracted configuration, and combinations thereof and intermediate configurations therebetween.

FIGS. 5A-5H illustrate exemplary configurations and intermediate configurations according to embodiments described herein. FIG. 5A illustrates an exemplary engagement device 50 having a stored configuration. The stored configuration is a reduced volume or reduced cross section configuration in which the payload size is reduced and/or designed for storing or positioning on a rocket or other propulsion system to get the engagement device to a desired altitude. FIG. 5B illustrates the exemplary engagement device navigated to the target of interest. The engagement device may navigate as described herein through any combination of navigation systems (momentum, propulsion, non-propulsion, solar energy, solar radiation, etc.). Once at the object of interest 58, the engagement device 50 extends the tape springs as seen in FIGS. 5C-5D. FIG. 5E illustrates the tape springs fully extended to a fully deployed configuration in which the tape springs are at their greatest elongated length. The elongation may be linear or may have a predefined shape, such as linear, curved, or curvi-linear, and combinations thereof. FIG. 5F illustrates the initiation of the engagement device to a retracted configuration. In this case, the tape springs are actuated to begin the transition back to the curved/rolled configuration. The engagement device transitions between FIGS. 5F-5G to the final retracted configuration of FIG. 5H in which the engagement device is coupled to the object of interest. The retracted configuration of the engagement device is generally an intermediate position between the fully deployed configuration and a reversion back to the stored configuration. Because of the obstacle imposed by the target object, the tape springs contact and engage the target object, which prevents the tape springs from fully reverting to the stored configuration. The tape spring may impose a force on the target object as the tape spring is biased toward the stored configuration.

Figure 6:
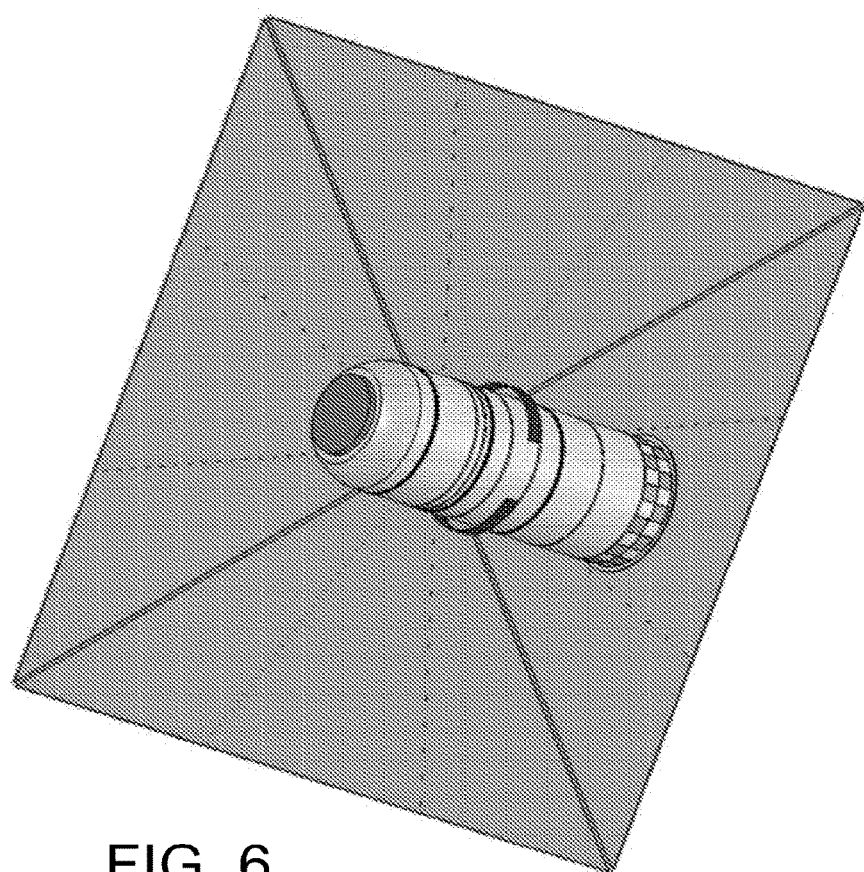
FIG. 6 illustrates an exemplary system configured to deploy an engine.

As seen in FIG. 6, the system may be configured to deploy an engine. The engine may comprise any propulsion or deceleration device. As shown in FIG. 6, the deployed deorbit engine comprises a vein. Once the engagement device is fully engaged to the debris, the deorbit engine can be deployed. Depending on the final design of the system, this deployment may vary in order to accommodate the particulars of the deorbit engine selected.

Referring back to FIG. 3, exemplary embodiments of a system for retrieving or coupling objects may include an engagement device according to embodiments described herein. The system may include an engagement device and a deorbit engine. The system may include a housing 32.

Exemplary embodiments of the system may include a housing. The housing may define a volume for the remaining system components, such as the engagement device and deorbit engine. The housing may contain the system components in a stored configuration. In an exemplary embodiment, the system may be fully contained within the housing in the stored configuration. The system may also be partially contained, such that the housing may include one or more partial housings for different component parts, such as the engagement device and the deorbit engine. The system may be configured to position the engagement device comprising one or more spring tapes in a rolled position for the stored configuration.

Exemplary embodiments of the system may include an engagement device. The engagement device may include one or more tape springs. The engagement device may include one or more actuators to change the tape spring from one configuration to another configuration. The one or more actuators may be used to extend the tape spring from the stored configuration to the deployed configuration. The stored configuration may be when the tape spring is substantially or fully rolled. The extended configuration may be when the tape spring is substantially or fully elongated. In an exemplary embodiment, the tape spring is fully deployed when it is linearly extended to define an elongated, generally linear extension to a maximum length. The tape spring may itself define a curved cross section, but the tape spring may be linear along a length of the tape spring when extended. The one or more actuators may be used to retract the tape spring to revert the tape spring toward the rolled configuration, although the retraction may not return the tape spring to a fully rolled shaped. The retracted configuration may be any non-linear orientation of the spring along its length, such as curved for the entire or substantial length or curved locally to define a bend between two adjacent generally linear extensions of the tape spring.

Figure 7A:
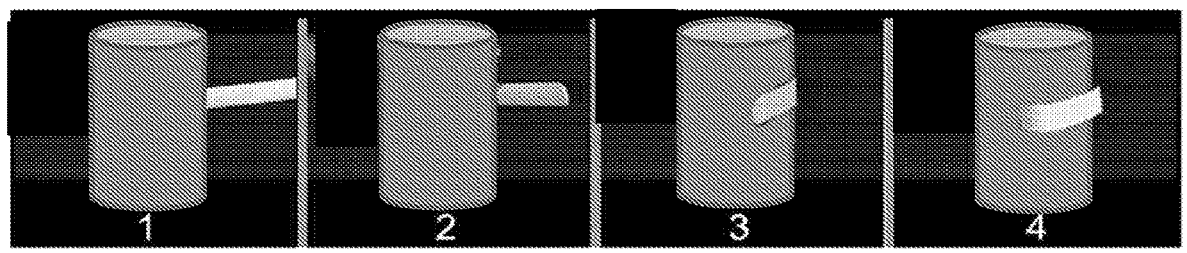

Exemplary embodiments include different combinations of tape springs. For example, as shown in FIG. 7A, a deployment of an exemplary engagement device including a single tape spring is illustrated. FIG. 7B illustrates an exemplary engagement device including two tape springs extending in opposing directions to circumscribe the target object by retracting from opposing sides of the object. As shown in FIG. 7B, the arms may be longitudinally offset or may extend along the same axis, such as illustrated in FIG. 5E. Opposing tape springs extending on opposing sides of the house may therefore extend linearly out of the housing and form a line extension of each other or may be offset parallel from each other, or other angular or rotational orientation. In an exemplary embodiment, one or more sides of the housing may include a plurality of tape springs extending therefrom. In an exemplary embodiment, the tape springs may be configured that when deployed and retracted the device may have minimal effects on its momentum. For example, arms may be symmetrically offset or in line, such that deployment and/or retraction reduces the imposition of a rotational momentum on the device creating misalignment with the target object during attachment.

FIG. 8 illustrates an exemplary tape spring according to embodiments described herein. In an exemplary embodiment, the tape spring may comprise composite carbon that is designed to have a low energy radius of curvature (1.5 m to 2.0 m) appropriate for the capture of the rocket bodies of interest. During stowage, the tape spring may be tightly wound onto a spool stored in the system and/or housing. To deploy the spring, the system may push or pull the spring through a mandrel that straightens the spring to its high energy straight state. When the tape spring is fully extended it is in an armed position and can be triggered to revert to its low energy state by perturbing the cross sectional area and inducing a buckle. As shown in FIG. 8, the tape spring 80 may include a rolled configuration 82 and an extended configuration 84. The extended configuration may define an elongated section. The tape spring may defined a curved cross section across as seen across dashed line and illustrated in FIG. 8A. The cross section of the elongated section may define a curve. The rolled configuration may define a compact configuration. The cross section of the tape spring within a roll may be linear, such that the tape spring flattens and reduces the cross sectional curvature obtained in the elongated sections.

Figure 10:
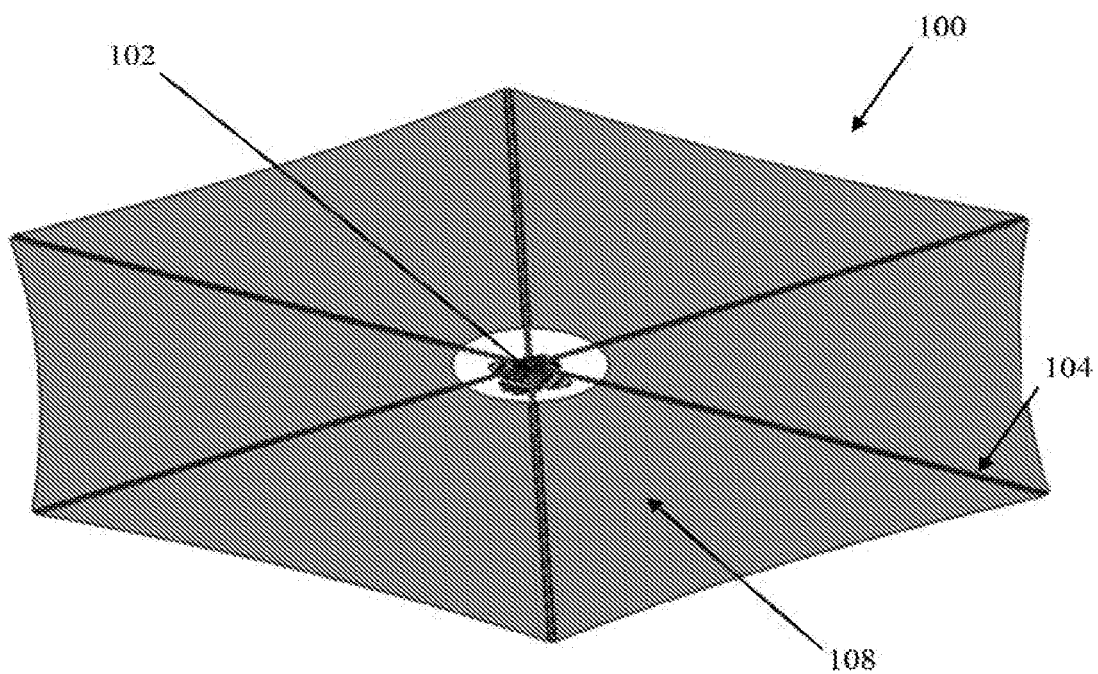
FIG. 10 illustrates an exemplary system according to embodiments described herein.

FIG. 10 illustrates an exemplary engagement device according to embodiments described herein. An exemplary engagement device 100 may include a plurality of tape springs 104. As illustrated, the tape springs 104 extend radially outward from a housing 102 or central location. As shown, the engagement device includes six tape springs extending radially outward within a plane in the deployed configuration. However, other configurations are also within the scope of the instant disclosure. For example, the tape springs may extend outward and forward to form a cone or pyramid-type structure or frame. More or fewer tape springs may also be used, such as three, four, five, six, seven, eight or more.

In an exemplary embodiment, the system 100 may include a surface 108 defined between one or more of the tape springs 104. As illustrated in FIG. 10, a material may be coupled between one or more tape springs. The material may be any structure, such as a net, mesh, membrane, fabric, etc. positioned between adjacent tape springs to act as a net. The system may be configured to create a net, bag, or umbrella-like surface for capturing debris. The surface and/or the tape springs may therefore be configured to contact and/or fully or partially enclose or encircle a target object to couple the engagement device to the target object. In an embodiment, a thin membrane of pliable material may be attached to the arms, forming a capture sack, like a tent fabric around several supporting poles, creating something similar to a bag or an umbrella. As the arms deploy to surround and secure the target object, the membrane enshrouds the object.

In an exemplary embodiment, the surface may entirely, shield the target object from the space environment. The membrane may be used to shield the enclosed object. For example, the membrane may include a component, material, or surface that obstructs use of the object. The surface may prevent signals, such as, for example, optical, radio, electric, magnetic, or other signal from being sent or received at the object. The surface 108 may include a coating, material, or combination thereof that interferes with signals or operation of the enclosed object. For example, the material may be opaque or substantially object to photons to reduce or prevent access of light to an photovoltaic array to cut off or reduce power to the object. For example, the material may include a metal or conductive coating and/or metallic or other conductive grid to create a Faraday cage to exclude electromagnetic influences from passing there through. In an exemplary embodiment, the grid may comprise a woven metallic or conductive thread or material.

Figures 11A, 11B, 11C, 11D:
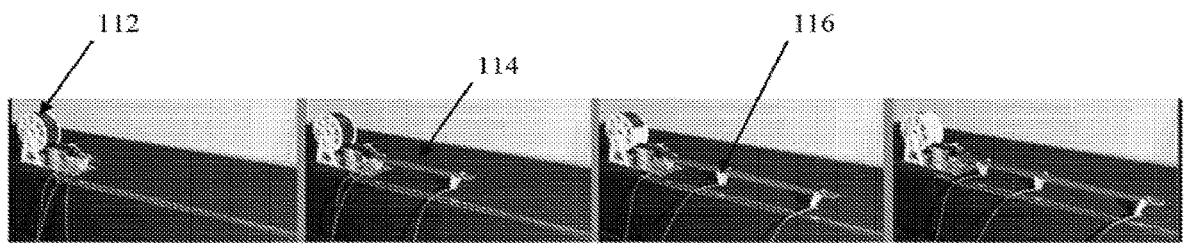
FIGS. 11A-11D illustrate exemplary deployment configurations for system components according to embodiments described herein.

In an exemplary embodiment, the system may include an actuator for deploying one or more of the tape springs. This can be effected by motors driving or pulling the stowed tape through a straightening mandrel. FIGS. 11A-11D illustrate an exemplary deployment actuator. As shown, the tape spring 114 is originally in a wound position in FIG. 11A. The wound tape spring 114 may be positioned on a mandrel 112 or simply rolled upon itself. The system may include one or more retractions actuators 116. In the stored configuration, the retraction actuators may be positioned against the rolled tape spring and/or adjacent the mandrel 112. As the tape spring is deployed, such as rotating the mandrel or rolled taped spring with the extension from the coil being straightened as it is unwound, the tape spring is permitted to slide through the retraction actuator. The tape spring may also or alternatively be pulled or pushed from the rolled configuration to the deployed configuration. At periodical intervals, the retraction actuators are coupled and positioned against the tape spring and move with the tape spring as it is extended. Therefore, as seen in FIG. 11B, a first retraction actuator is positioned adjacent an end of the tape spring as the tape spring is deployed. In FIG. 11C, the first retraction actuator remains adjacent the end of the tape spring as the tape spring is further deployed, and a second retraction actuator previously positioned adjacent the mandrel 112 or wound body portion of the tape spring is moved with the extended portion of the tape spring at an interval away from the first retraction actuator. As seen in FIG. 11D, the first and second retraction actuators continue to deploy along the tape spring at the same relative positions as the tape spring continues to deploy. Different combinations of features may be used to selectively position the retraction actuators along the length of the tape spring during deployment. The actuators may include a tether therebetween and/or to locations on the tape spring. The retraction actuators and portions of the tape spring may include mated features that engages when the tape spring passes through or past the actuator. The mated features may be electrical, magnetic, shaped surfaces, size or orientation of peripheral edges, size or orientation of cross sections, indents/detents/projections/hooks/loops/etc. The mated feature may be any combination described herein. The retraction actuator may also be directly attached to, be a covering on, or be integrated into the tape spring itself. The retraction actuator may therefore be rolled with the tape spring and extended when the tape spring is deployed.

Figure 12:
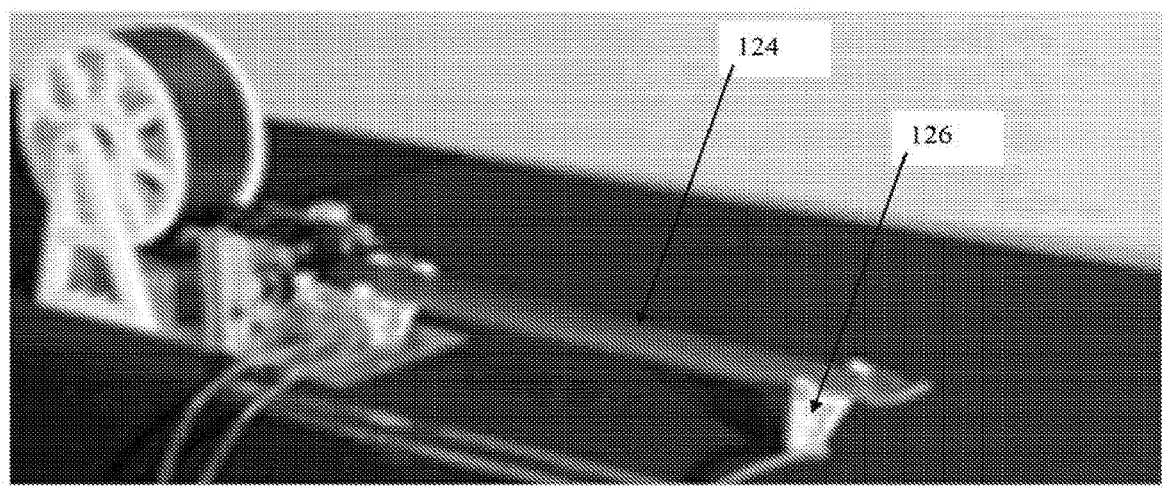
FIG. 12 illustrates an exemplary tape spring with actuators according to embodiments described herein.

In an exemplary embodiment, the system may include an actuator for retracting the one or more tape springs to transition from the deployed configuration to a retracted configuration. When the engagement system is armed, a trigger (or series of triggers along length of spring) can deform the tape spring such that it can begin to roll up into its low energy curved state. In an exemplary embodiment, the trigger may be configured to impose a force on the tape spring to revert the tape spring from its straight to its curved configuration. The trigger may be a mechanical device in contact with the spring. The trigger may be an electromechanical device, such as a piezoelectric material that deforms and imposes a force on the tape spring upon application or removal of an electric signal. Other triggers may be used, such as mechanical, optical, electric, devices and combinations thereof. In an exemplary embodiment, the retraction actuator is configured to deform a cross section of the tape spring to trigger the tape spring to transition to another condition. FIG. 12 illustrates an exemplary retraction actuator on a tape spring being deployed. The retraction actuator 126 is positioned on the tape spring 124. The retraction actuator coupled to the sides of the tape spring and extends across the cross-wise dimension of the tape spring. The actuator includes a contact element that is configured to apply a force onto the surface of the tape spring to trigger a transition to the coiled configuration.

Exemplary embodiments may include a control system for the one or more triggers. In an exemplary embodiment the control system may be configured to actuate the retraction actuators in a predetermined orientation, timing, and combination to influence or control the resulting momentum change (such as rotation) of the system relative to the debris. For example, the control system may be used to symmetrically actuate the one or more retraction actuators to avoid or reduce inducing a rotation in the system and misaligning the engagement device with the debris. The retraction actuators may also be controlled to define a shape of the retraction envelope. For example, FIGS. 13A-13D illustrate an exemplary system according to embodiments described herein in which the retraction of the envelope is controlled to capture a target object (not shown). As seen in FIG. 13A, the tape springs are fully deployed and extend to their maximum longitudinal length with a surface positioned between adjacent tape springs. As illustrated, the deployed system define a generally planar surface. FIG. 13B illustrates the system with a first set of retraction actuators triggered to change a shape within the system. The first set of retractions actuators are proximate or nearest the center of the system proximate the housing (not shown). The deployment of the retraction actuator bends the tape springs at the first set of actuators to move the terminal ends of the tape spring in the same direction and out of plane from the deployed configuration. The system begins to take on a conical shape. FIG. 13C illustrates the system with a second set of retraction actuators triggered to again chain the shape of the system. The second set of actuators are adjacent the first set of actuators but further toward a peripheral edge of the system than the first set of actuators. FIG. 13D illustrates the system with a third set of retraction actuators being triggered to transition the system to the retracted configuration. The retraction actuators and the tape springs may be configured and positioned to define different retraction configurations and intermediate configurations to define different envelops or cavities to accommodate different target objects. Additionally or alternatively, strategic deformations may be made to the tape spring to cause it to buckle at prescribed locations. The composition, deformations, construction, shape, and combinations thereof may be used to define and/or influence a shape of the retracted configuration. As seen in FIG. 13D, the tape springs may be deformed such that a retracted configuration may include curved, rolled, linear, orientations and combinations thereof.

In an exemplary embodiment, the system may be configured to retract passively with the tape springs being actuated automatically with contact with the target object. The target object may contact the tape spring and trigger the actuation itself. The system may be configured such that the target object contacts either the tape spring or the target object to trigger the retraction of the tape springs. For example, the tape springs may have the configuration of FIG. 10 defining a planar configuration. The system may also have the tape springs extending radially outward and forward in a first direction to define a generally conical or pyramidal shape in the fully deployed configuration. The surface supported by the tape springs may be coupled at or adjacent a terminal end of the tape spring and contained within an interior space defined by the frame of the tape springs. FIG. 14 illustrates an exemplary embodiment with a surface defined between and within an interior space defined by a plurality of tape springs in a fully deployed configuration. The surface may therefore define a generally planar surface or may be shaped by its contact or position along the length of the tape springs. In an exemplary embodiment, contact with the surface may impose a force on the tape springs in a radially inward direction, trigger the transition to the retracted configuration.

Exemplary embodiments of the system may include a propulsion system for navigating the system to an object of interest. The propulsion system may be any propellant and/or propellant less system, such as, for example, solar sails, veins, balloons, rockets, compressed gas or liquid, and combinations thereof. The propulsion system may be the same as or different from the deorbit engine.

Exemplary embodiments of the system may include a deorbit engine. In an exemplary embodiment, the deorbit engine may be deployed from the system after the engagement device is fully engaged with the debris. In this scenario, the system and the debris may be tumbling with the same dynamics as debris. Once the engagement device is fully engaged and deployed, the system may slowly begin to deorbit the debris. Even though deorbit may still be slow, exemplary embodiments may be used to provide a 10× faster rate of deorbit than its natural rate. Passive deorbit engines (balloons, ballutes, and aerobrakes) may be used without additional controls. The passive deorbit engines may be used to simply pull the system to lower orbit over time ending in an uncontrolled re-entry of the debris. Active deorbit engines (vane sails, tethers, and traditional propulsion systems) can be used with additional and/or constant control to best utilize the thrust generated by the engine. In an exemplary embodiment, the active engine system may still culminate in an uncontrolled reentry of the debris.

When the system is separated, such as pushed from the host vehicle or launch vehicle that gets the system to an approximately orbit of the debris, it may be necessary or desirable to rendezvous even closer with the debris and hold position while deployment of the engagement device takes place. A simple small sat prop system may be used to maintain position by using image recognition of the debris. Alternatively, the engagement system may be fully deployed prior to release from the host vehicle and engagement may be triggered with a proximity sensor when the engagement device is at a preset distance from the debris. Accordingly, exemplary embodiments may include additional components such as proximity sensor, computer processors and memory, control systems, and combinations thereof to control the deployment and/or navigation of the system relative to the debris.

In an exemplary embodiment, multiple engagement devices can be carried by one capable host vehicle to multiple debris targets, in a milk-run fashion. The multiple units could be designed to stow into an ESPA sized spacecraft and launched as secondary payloads. Several systems may be carried per ESPA bay and multiple ESPA slots per secondary ring. This multiplication would enable cost effective orbital cleanup of large debris objects.

Exemplary embodiments of systems described herein include two major elements: 1) the engagement device, and 2) the deorbit engine. An exemplary packaged system would be targeted to stow into a volume of 1 m×1 m×0.25 m. FIG. 6 illustrates an exemplary deployed system engaged with an SL-16 rocket body. The exemplary system has a solar sail area of 450 m². Exemplary embodiments are described in terms of both the engagement device and the deorbit engine. However, the invention does not require the presence of all elements. For example, the spring tape attachment device and method may be used with other devices in place of the deorbit engine as a method of retaining or coupling parts and objects together.

Exemplary embodiments include an engagement system using tape springs. The tape spring may be cold-worked in their forming process to build up large internal prestresses. But, they may be stress-free in neither the rolled nor deployed states. However, they may release strain energy as they roll up.

Exemplary embodiments described herein may include tape-springs. Exemplary embodiments of a tape spring may include slit tubes. Exemplary embodiments of a tape spring may be made from both metallic and/or composite materials, as an engagement device. A cylindrical cross-section may be rolled or folded, such that it stores a significant amount of strain energy that may be held during launch. On orbit, this strain energy may be released and used to power deployment of the structure. With this approach, the structure may be fabricated in a cylindrical shape having a reduced stress state in the deployed configuration. Triggers may be used to deform the cross section of the tape spring in the deployed configuration (or elongated shape) to transition the tape spring to the retracted configuration according to embodiments described herein. These devices may be deployed with motors and mechanisms that essentially serve as brakes to control the release of strain energy. Therefore, exemplary triggers may be positioned along a length of a deployed tape spring to target transition of the spring to the retracted configuration.

An exemplary embodiment includes inverse tape-springs that self-retract, rather than self-deploy as an engagement device. Exemplary embodiments, may include a generally tape like (having a substantially reduced thickness as compared to a width dimension) structure. The tape-like structure may have a radius of curvature in a direction perpendicular to the longitudinal axis of the tape spring. The cross section of the tape spring may define an arc or curve. The arc may define a single radius such that the cross section of the tape spring may form a portion of a circle. The arc may define other portions of a curve, such as an ellipsoid, ovoid, circle and combinations thereof. The spring may extend generally linearly in a deployed configuration and may be rolled in a stored configuration. The spring may roll on itself in the direction of the concavity of the spring. For example, the spring may roll such that portions of the spring roll in on itself toward the concave side of the spring. The spring may also roll in the other direction such that the portion of the spring rolls in on itself toward the convex side of the spring. Metallic tapes may be cold-worked in their forming process to build up large internal pre-stresses. They may be stress-free in neither the rolled nor deployed states, thus releasing strain energy as they roll into a coil.

FIG. 8 shows a composite tape that wants to retract and roll up. The illustrated tape is configured to roll in the direction of the concave side of the tape. This tape may be fabricated in a stress-free rolled up configuration and store strain energy as it is unrolled. With careful selection of a laminate, the tapes can be made such that they are marginally stable in the unrolled shape. A motorized mechanism can be used to deploy a tape from a highly compact rolled shape to the straight, unrolled shape. These tapes may be marginally stable and impact with another body may be used to trigger the tape into retracting. By tailoring the tape cross section and composite layup, the trigger sensitivity can be engineered.

Exemplary systems may include a trigger system for triggering the tape from one configuration to another. The trigger system may include a device configured to apply a force to the tape spring at one or more strategic locations along the length of the tape spring. The trigger system may include an impact trigger such that the tape spring is impacted by another object. The trigger system may include a pincher such that the tape spring experiences pressure by the trigger system on one or both sides of the tape spring. Other trigger systems are contemplated herein that are configured to buckle the tape spring. Exemplary triggers may include coatings or material coverings that deform a cross section of the tape and/or impose a pressure or force on the tape. Exemplary embodiments may include material coatings, coverings, or integrated spring materials for triggering the retraction of the tape spring. For example, piezo electric or other materials may be used to locally deform or manipulate the tape spring to trigger a retraction upon application of an electrical signal.

Exemplary systems may include a deployment system for extending the tape spring from a rolled configuration to a linear configuration. Linear configuration includes the general extension of the tape spring in a single direction, with the understanding that the tape spring itself may include a curved surface. The deployment system may be configured to push or pull the tape spring through a mandrel to force the spring tape into its linear configuration. Other deployment systems may be used, such as a runner configured to straighten the tape spring as the runner is passed over or by or the tape spring is run through the runner.

Figure 9:
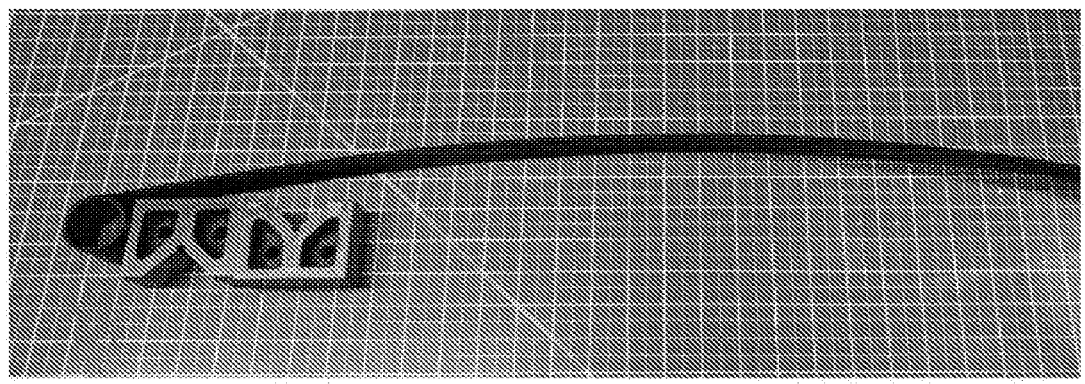
FIG. 9 illustrates an exemplary tape spring according to embodiments described herein.

Several variations on this basic composite component are within the scope of the present disclosure. For example, as seen in FIG. 9, it is possible to fabricate tapes with curvatures in the longitudinal cross sectional direction in the unrolled or elongated configuration. Curvature may provide enhanced grasping geometry. The rolled diameter can be controlled by fabricating tapes with large diameter so that they more naturally wrap around larger diameter objects. Exemplary embodiments may include a laminate, such as a coating or covering, that can be tailored for specific configurations. For example, edges can be trimmed and curved along the tape length so that rather than fully rolling, the tape retracts in a segmented pattern. Again, this may be beneficial to enhance the grasping and holding potential.

An exemplary operational sequence includes any combination of the system approaching the target object; opening the housing/canister of the system; deploying the engagement device; rendezvous with the target object; engage the system to couple to the target object; deploy the deorbit engine; navigate using the coupled engine; deorbit the target object; recycle the engagement system.

In an exemplary mission operation according to embodiments described herein, the operation of embodiments of the system may include the host spacecraft that is carrying engagement and/or deorbit system having a level of rendezvous and proximity operations (RPO) capability to deliver the engagement system to the space debris. Exemplary embodiment may however use one or more engines associated with the engagement system to navigate the system to the space debris after separation from the host spacecraft and before engagement with the space debris.

When the system is appropriately positioned in a desired orientation and/or position relative to the space debris, the canister (housing) holding the engagement device is opened allowing the engagement device to be deployed. The canister is constructed of walls confining the tape springs and/or the surface/membrane. The canister may enclose the engagement system during time from final assembly until the deployment device is called on to engage with debris. Exemplary embodiments may be a self-contained and self-supported system that bolts, couples, or is a payload onto or of an existing host spacecraft. Exemplary embodiments also include highly integrated and coupled designs wherein the engagement system and/or its canister is part of the host spacecraft and is controlled and maintained directly by the host spacecraft subsystems.

Upon command, the engagement system deployment sequence is initiated. The tape springs are driven to their final position (full extension or less, depending on the debris). With an attached membrane spanning between the arms, the system may use the deployment of the tape spring arms to deploy the membrane as well. The membrane may be towed into position by the deployment of the tape springs and may be stretched between adjacent arms by the geometry of the structure.

After deployment, the engagement system may be positioned closer or relative to the debris (within the capture arc of the tape spring arms) and positioned for engagement. In an exemplary embodiment of an operational mission, a piece of space debris may be tumbling or moving with respect to the engagement device. In such a case, the system host vehicle could be made to match the rotation/motion rate of the debris there by minimizing the forces on the engagement system during capture. Alternatively, the debris could be left to move and the engagement of the system effectively connects the two elements and resisting loads are transmitted through the engagement device.

Upon command (either active or passive), the engagement device is actuated to capture the debris object. The command may be sent to a controller that initiates a programmed sequence of actuators to strategically deform the tape springs to cause them to revert to their low strain energy position/condition. These actuators can be as simple as a solenoid or pneumatic piston pressing on the curve of the tape spring to locally disturb the cross section curvature of the tape spring. When the cross section is disturbed, the tape spring will revert to the low-strain-energy condition. Simple solenoids could be replaced with solid state actuators (such as piezoelectric devices). Additionally or alternatively, strategic deformations may be made to the tape spring to cause it to buckle at prescribed locations.

When the engagement system is triggered, the actuators and/or strategic deformations cause the tape springs to revert to a low strain condition. This condition can be tailored to the application during manufacturing. The low strain condition may be curved in nature allowing the tape springs to fully engage and/or capture the debris. With a multi-armed system, the arms may be fired simultaneously and they could tow a membrane along with them to fully/partially encapsulate the debris object. The membranes can serve many purposes not the least of which is the containment of any ancillary debris made during the engagement and de-tumble of the debris.

In the event that the system misfires and does not engage with the debris as intended, it is possible to mechanically reel in the arms of the system and reset it for another try at engagement. It may also be possible to imagine using this feature to de-engage with the debris object that is captured. This would give the operator the opportunity to capture a piece of debris, move it to a new location, and then release it in a new position and/or capture another piece of debris.

The deorbit engine may be the device providing the drag or propulsion that causes the debris to lose orbital energy and eventually enter Earth's atmosphere. Exemplary engines may include any combination of: a ballute/balloon, vane sail, aerobrake, propulsion system, electrodynamic tethers, or other engines described herein or known to persons of skill in the art.

The SL-16 rocket bodies of interest have a cross sectional area of ~4 m×~10 m. To target a 10× decrease in deorbit time, the drag area may be increased by a factor of ten. The target size for the spherical balloon drag engine is ~23 m in diameter. The target size for a sail is 20 m per side. Exemplary embodiments may also include sails that employ solar radiation pressure and drag pressure to reduce the overall size of the sail.

Active deorbit engines include electrodynamic tethers, traditional propulsion, and solar sails. These devices may need to know something about the position of the debris at all times that the device is active. The system may therefore be able to operate fully autonomously but may include onboard routine processing to make control decisions about the deorbit thrust.

Electrodynamic tethers produce thrust by producing a current in the presence of the Earth's magnetic field. The tether uses solar power to create an electric potential in the conductor (kilometers long tether). When this potential is supplied with electrons (ions) it produces a current that interacts (cross product) with the magnetic field to create a thrust.

Traditional propulsion systems may be used as a deorbit engine.

Figure 15:
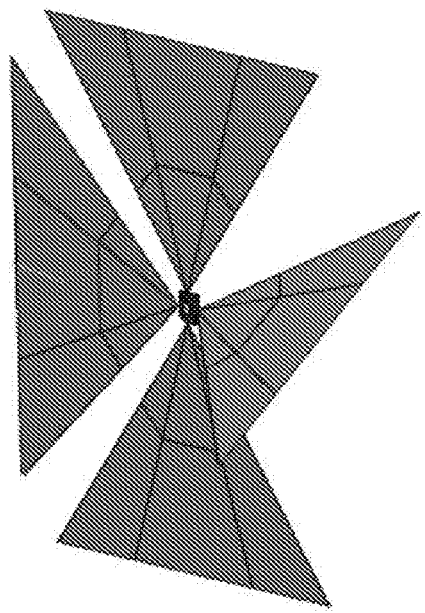
FIG. 15 illustrates an exemplary engine according to embodiments described herein.

The vane sail is a novel system using four articulated solar sail vanes to create solar radiation pressure. With the articulation of the vanes, it is possible to meter and turn off the thrust produced by a solar sail. This modification allows for the use of solar sail in Earth orbit. The solar sail is particularly well suited to the deorbit mission because of its perpetual and propellantless operation. Although the four-vane configuration is disclosed, it is contemplated that other vane sail configurations may be used. FIG. 15 illustrates an exemplary embodiment of the articulate solar sail having four vanes. Each vane defines a cross sectional area that may be oriented independent of one or more of the other vanes. The articulation of a vane may be rotational.

Figure 16:
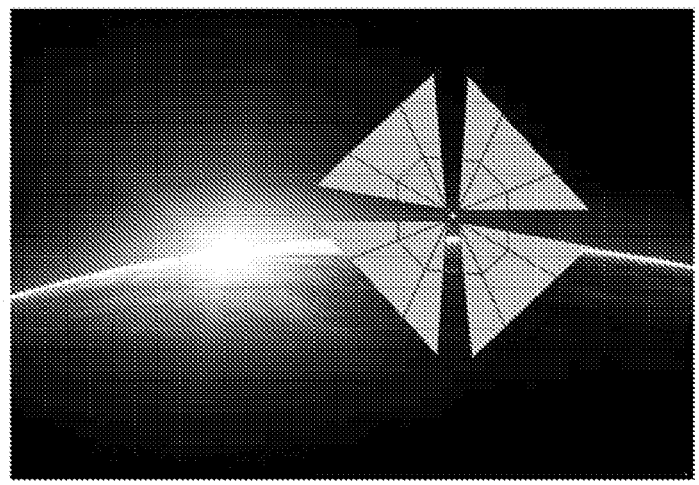
FIG. 16 illustrates an exemplary engine in order according to embodiments described herein.

The vane sail may be a segmented and articulated solar sail that has unique operational capabilities that may be exploited for embodiments of the engagement device described herein. The vane sail for deorbit may be deployed to shape using a mechanical structure, such as STEM tubes. These mechanical struts may deploy the sail to its full area and provide structural integrity during operation. The vane sail illustrated in FIG. 15 is rendered showing an articulated vane. FIG. 16 illustrates an exemplary embodiment of the sail of FIG. 15 in orbit.

Exemplary embodiments of the vane sail may be used to allow for the operation of solar sails in Earth orbit. By articulating the vanes individually or corporately, the thrust can be vectored and turned off. This allows the vane sail operator to strategically add or remove orbital energy at will. Solar radiation pressure thrust is very small but is perpetual and requires no consumables. Such a phenomenology is well suited to the challenge of debris removal and for high LEO orbits. The vane sail may include one or more solar panels to power the actuators for controlling the individual vane orientations.

Exemplary embodiments may include a multi-element satellite, such as described by U.S. Pat. No. 9,499,285, incorporated by reference in its entirety herein. The multi-element satellite may provide tomographic surveys of in situ space objects by fractionating a single vehicle into a physical multi-node structure connected by deployable booms. Once deployed on orbit, the multi-element satellite may be able to maneuver and rendezvous with the target satellite and then match its orientation and tumble rates by spinning up the structure. Any number of propulsion technologies can be employed from cold gas and solid propellant through to electric propulsion.

Passive devices may be deployed to shape and then work as drag devices without any control required for their entire life. These devices include inflatably deployed balloons/ballutes (sphere, torus, cone, stacked torus, prism, etc) and mechanically deployed drag areas like an aerobrake. The inflatable solutions may require exemplary embodiments of the systems described herein to carry makeup inflatant to deal with holing from debris and micrometeoroids. The mechanically deployed solutions may require more structural mass.

Most balloons and ballutes use inflatant pressurization to provide structure. These devices may require a supply of makeup gas to maintain the pressure inside the envelope to maintain structural integrity. It is also contemplated that a balloon/ballute may be built of sufficiently stiff material such that makeup gas is not required (the Echo balloons are examples of these). These types of envelopes are significantly heavier than their counterparts, but they may not need heavy makeup gas supply systems.

Mechanically deployed devices are erected and maintained to shape through the use of clever deployment mechanisms. Once to full shape the deployed surface area may be held in shape by the same mechanism that drove it to deploy originally. These devices can deploy two-dimensional surface areas (think of a disc vs. a sphere) and thereby reduce the total amount of material deployed. However, the structure to support the aero loads may require significant mass and stowed volume.

Although embodiments of this invention have been described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An engagement device, comprising:
   a tape spring extending in a deployed configuration in a first direction;
   a second tape spring extending in a second direction in the deployed configuration, wherein the second direction is at least partially in an opposing direction from the first direction; and
   at least one actuator for extending the tape spring from a stored configuration where the tape spring is at least partially rolled to a deployed configuration in which the tape spring is at least partially extended,
   wherein the tape spring and the second tape spring comprise free terminal ends in the deployed configuration and are configured so that a target object is permitted to enter past the free terminal ends and be positioned between the tape spring and the second tape spring.

2. The engagement device of claim 1, wherein the first direction and second direction are parallel to each other in opposing directions.

3. The engagement device of claim 1, wherein the engagement device comprises a retracted configuration configured to couple the engagement device to the target object, wherein the tape spring and the second tape spring are bent in the retracted position in an orientation between the stored configuration and the deployed configuration.

4. The engagement device of claim 3, wherein the first direction and second direction are angled with respect to each other in a non-parallel configuration.

5. The engagement device of claim 3, wherein the actuator is configured to retract the tape spring from the deployed configuration to the retracted configuration by deforming the tape spring causing the tape spring to bend.

6. The engagement device of claim 5, wherein the tape spring tape spring and the second tape spring extend on opposite sides of a housing configured to extend on opposite sides of a target object for capture, wherein in the retracted configuration, the tape spring and the second tape spring are configured to retain the target object therebetween.

7. The engagement device of claim 5, further comprising a trigger configured to deform the tape spring to transition the tape spring to the retracted configuration in which the tape spring is curved from the deployed configuration in which the tape spring is straight.

8. The engagement device of claim 1, further comprising a plurality of triggers positioned along a length of the tape spring to permit separate bending points along the tape spring.

9. The engagement device of claim 8, further comprising a surface defined between the tape spring and the second tape spring.

10. A system comprising the engagement device of claim 1 and further comprising a deorbit engine.

11. A method of coupling to a target object, comprising:
    navigating an engagement device proximate to the target object;
    extending a first tape spring from a stored configuration to a deployed configuration;
    extending a second tape spring from a stored configuration to a deployed configuration in a second direction at least partially opposite a first direction of the first tape spring;
    moving the engagement device relative to the target object so that the target object passes past free terminal ends of the first tape spring and a second tape spring and positioned between the first tape spring and the second tape spring; and
    actuating the tape spring to collapse to a retracted configuration coupling the engagement device to the target object by bending the first tape spring and the second tape spring around the target object.

12. The method of claim 11, wherein the stored configuration has a tape spring in a rolled condition and the deployed configuration has the tape spring in an elongated configuration.

13. The method of claim 12, wherein the engagement device comprises a plurality of triggering devices to bend the tape springs at multiple points and the actuating the tape spring comprises actuating the plurality of tape springs at the multiple points.

14. The method of claim 13, wherein the actuating the plurality of tape triggering devices comprises a plurality of actuations run sequentially in which a first set of actuations triggers a bend in each of the plurality of tape springs at a first location along a length of each tape spring and a second set of actuations triggers a bend in each of the plurality of tape springs at a second location along the length of each tape spring, wherein the second set of actuations are triggered after the first set of actuations and the second location is toward an outer perimeter of the engagement device and the first location is toward an interior of the engagement device.

15. The method of claim 11, wherein the engagement device comprises a surface between the plurality of tape springs and coupling the engagement device to the target object comprises enclosing the target object within the surface.

\* \* \* \* \*